(12) United States Patent
Sutherland (10) Patent No.: US 12,460,442 B2
(45) Date of Patent: Nov. 4, 2025

(54) FENCE DEVICE

(71) Applicant: The Trustee for Sutherland Trust, Tyalgum (AU)

(72) Inventor: William Peter Sutherland, Tyalgum (AU)

(73) Assignee: The Trustee for Sutherland Trust, Tyalgum (AU)

( * ) Notice: Subject to any disclaimer, the term of this patent is extended or adjusted under 35 U.S.C. 154(b) by 507 days.

(21) Appl. No.: 17/750,963

(22) Filed: May 23, 2022

(65) Prior Publication Data
US 2022/0372784 A1    Nov. 24, 2022

(30) Foreign Application Priority Data
May 24, 2021    (AU) ................................ 2021901544

(51) Int. Cl.
*E04H 17/10*    (2006.01)
*E04H 17/00*    (2006.01)

(52) U.S. Cl.
CPC ......... *E04H 17/124* (2021.01); *E04H 17/017* (2021.01)

(58) Field of Classification Search
CPC ....... E04H 17/017; E04H 17/02; E04H 17/04; E04H 17/045; E04H 17/06; E04H 17/10; E04H 17/12; E04H 17/124; A01K 3/005
See application file for complete search history.

(56) References Cited

U.S. PATENT DOCUMENTS

| | | | | |
|---|---|---|---|---|
| 2,631,804 A * | 3/1953 | Uhlhorn | ................. | E04H 17/12 24/131 R |
| 2,858,106 A * | 10/1958 | Anton | .................... | E04H 17/124 256/48 |
| 4,077,611 A * | 3/1978 | Wilson | ................. | H01B 17/145 256/10 |
| 4,263,477 A * | 4/1981 | Wilson, Sr. | .......... | H01B 17/145 174/166 R |
| 4,599,488 A * | 7/1986 | Wilson, Jr. | ........... | H01B 17/145 174/158 F |
| 4,771,137 A * | 9/1988 | Thompson | ........... | H01B 17/145 174/172 |
| 4,866,218 A * | 9/1989 | Wilson, Jr. | ........... | H01B 17/145 256/10 |
| 4,982,932 A * | 1/1991 | Baker | ..................... | E04H 17/12 256/48 |

(Continued)

FOREIGN PATENT DOCUMENTS

DE    202021000678 U1 * 5/2021
FR       2565780 A1 * 12/1985
(Continued)

OTHER PUBLICATIONS

Search Report and Written Opinion to French Patent Application No. FR2204951.
Office Action to Argentine Patent Application No. 20220101345.

*Primary Examiner* — Jonathan P Masinick
(74) *Attorney, Agent, or Firm* — Thomas Horstemeyer, LLP (57) ABSTRACT

Disclosed is a fence device for supporting a fencing wire. The fence device has a body having an inner surface defining an aperture through the body. The aperture can be for receiving the fencing wire. The inner surface can be at least partially convex towards the aperture.

14 Claims, 12 Drawing Sheets

(56) References Cited

U.S. PATENT DOCUMENTS

| | | | | |
|---|---|---|---|---|
| D416,859 S | * | 11/1999 | Langlie | D13/129 |
| 5,975,501 A | * | 11/1999 | Berg | E04H 17/124 |
| | | | | 256/48 |
| 6,380,490 B1 | * | 4/2002 | Gaston | H01B 17/145 |
| | | | | 256/10 |
| 6,443,409 B1 | * | 9/2002 | Zanzucchi | B43M 15/00 |
| | | | | 248/216.1 |
| 6,583,363 B1 | * | 6/2003 | Wilson, Jr. | H01B 17/145 |
| | | | | 256/10 |
| 7,968,797 B2 | * | 6/2011 | Williams | H01B 17/22 |
| | | | | 256/10 |
| 8,540,217 B2 | * | 9/2013 | Olsson | E04H 17/12 |
| | | | | 256/48 |
| 9,551,457 B2 | * | 1/2017 | Johns | E04H 17/24 |
| 10,170,221 B2 | * | 1/2019 | McKinley | A01K 3/005 |
| 10,934,741 B2 | * | 3/2021 | Malins | E04H 17/124 |
| 2004/0026678 A1 | * | 2/2004 | Vandergriff | A01G 17/06 |
| | | | | 256/47 |
| 2005/0061924 A1 | * | 3/2005 | Boyle | E04H 17/124 |
| | | | | 248/49 |
| 2008/0135822 A1 | | 6/2008 | Forero | |
| 2011/0233497 A1 | * | 9/2011 | Forge | E04H 17/12 |
| | | | | 24/458 |
| 2013/0328000 A1 | * | 12/2013 | Hendricks | E04H 17/124 |
| | | | | 256/10 |
| 2014/0318828 A1 | * | 10/2014 | Nelson | H01B 17/145 |
| | | | | 174/163 F |
| 2018/0254128 A1 | * | 9/2018 | Stoner | H01B 17/145 |

FOREIGN PATENT DOCUMENTS

| | | | | | |
|---|---|---|---|---|---|
| GB | | 1411228 A | * | 10/1975 | E04H 17/12 |
| GB | | 2187771 A | * | 9/1987 | A01K 3/005 |
| GB | | 2286839 A | * | 8/1995 | A01K 3/005 |
| WO | | 2003029583 A1 | | 4/2003 | |
| WO | WO-2005075764 A1 | | * | 8/2005 | E04H 17/12 |
| WO | WO-2013188044 A1 | | * | 12/2013 | A01K 3/00 |
| WO | | 2021003522 A1 | | 1/2021 | |

\* cited by examiner

FENCE DEVICE

This application claims priority from Australian Provisional Application No 2021901544, filed on 24 May 2021, the entire contents of which are hereby incorporated in their entirety by reference.

TECHNICAL FIELD

The present disclosure relates, generally, to wire fencing and, more particularly, to a fence device for supporting a fencing wire.

BACKGROUND

Wire fences, including wire field fencing and wire strand fencing, are a common type of farm fencing. Fences typically have a strainer assembly (or "corner post") at either end, and intermediate posts that guide the line wires off the ground at the correct spacings. The wires stretch between and are connected to the intermediate posts along the fence.

Attaching fence wires to intermediate posts is extremely labour-intensive. For wooden fence posts, for example, holes need to be drilled into timber fence posts to run wires through, or alternatively staples need to be hammered into the posts at every point where every fence wire runs past or wraps around a post.

Steel fence posts are a popular type of post, being both economical and easy to use. Steel posts, also called T-posts, Y-posts, star posts, star pickets, or steelies, typically have three vertical elements so that the post has a T- or Y-shaped cross-section shape. Star posts can support various types of wire or wire mesh, and have holes spaced along one or more of the vertical elements used for attaching the fence wires. Smooth wires can be run through the holes in the vertical elements. However, as this limits the flexibility of the installation, usually the wires are attached by tying the fence wire to the post with a piece of wire fitted through one of the holes in the vertical element of the post. This is also required for barbed wire which cannot be threaded through the holes due to the barbs.

One product that aims to solve the problem of how tedious and time-consuming it is to attach wires to fence posts, is the Clipex fence post assembly, where the holes are replaced with slots so that the wires can be slid into a retained position in the vertical element of the star post, and each slot has a keeper that is latched over the slot to retain the wire therein.

Over time, fence wire tends to sag, and require tightening. With one end of the wire securely attached to a corner post or brace post, the wires are then released from the attachments to the intermediate posts and the wire is tightened using any number of known methods and a variety of tools such as pliers, fence tighteners, a rope or mechanical fence puller, a lever and come-along, gripples, wire-strainers, ratchet-type tensioners, etc.

When the fence wires of a wooden picket fence are tightened, the staples that restrain the wires need to be removed before tightening, and hammered in again afterwards. When the fence wires of a star post fence are tightened, the attaching wires in the holes of the vertical elements of the posts are untied, releasing the fence wire from the post so that the fence wire is free to move during tightening. If the fence wire is not released, the wire could break and/or the post will be pulled over (and may be dislodged) during fence tightening. After tightening, each wire at each fence must be reattached again. If latched star posts, such as the Clipex posts, are used with straight wires, then the fence wires may be tightened without releasing them from the Clipex posts if the slots are sized to accommodate the movement of the wires.

When barbed wire is used, tightening the fence wire has the added complication of the barbs on the wire. With Clipex posts, for example, the barbs cannot move through the slots because the slots are sized to accommodate the diameter of the wire only. The slots cannot, for example, be enlarged to accommodate the movement of the barbs therethrough at least because the cross-section of a barb can be as large as 20-30 mm, while the typical width of a star post element is only about 25 mm.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

In one aspect there is provided a fence device for supporting a fencing wire, the device comprising: a body having an inner surface defining an aperture through the body, the aperture for receiving the fencing wire, wherein the inner surface is at least partially convex towards the aperture.

The inner surface may be at least partially convex to form a ramp into the aperture so that, in use, the fencing wire is guided across the surface and through the aperture.

The fence device may further comprise an ingress to the aperture, configured to provide an entryway for a wire into the aperture. The ingress may be formed by a channel connecting an outside of the body and the aperture, wherein a cross-section of the channel is substantially L-shaped. In use, the ingress may be positioned on an upper half of the body.

The fence device may further comprise a connecting means configured to connect the fence device to a fence post. The connecting means may comprise: a receiving region configured to receive a portion of a fence post therein; and a locking means configured to join the device to the fence post. The receiving region may comprise a pair of holding tabs defining a picket channel configured to fit onto a vertical element of a Y-post; and the locking means may comprise a pin aperture in each of the holding tabs, the pin apertures aligned and configured to receive a locking pin.

The inner surface may be annular so that the aperture is substantially round. The body of the device may be substantially annular.

The fence device may further comprise a wire guide attachment configured to connect with the body, the wire guide attachment for supporting fencing wire.

BRIEF DESCRIPTION OF DRAWINGS

Embodiments of the disclosure are now described by way of example with reference to the accompanying drawings.

In the drawings, like reference numerals designate similar parts.

DESCRIPTION

Figure 1A:
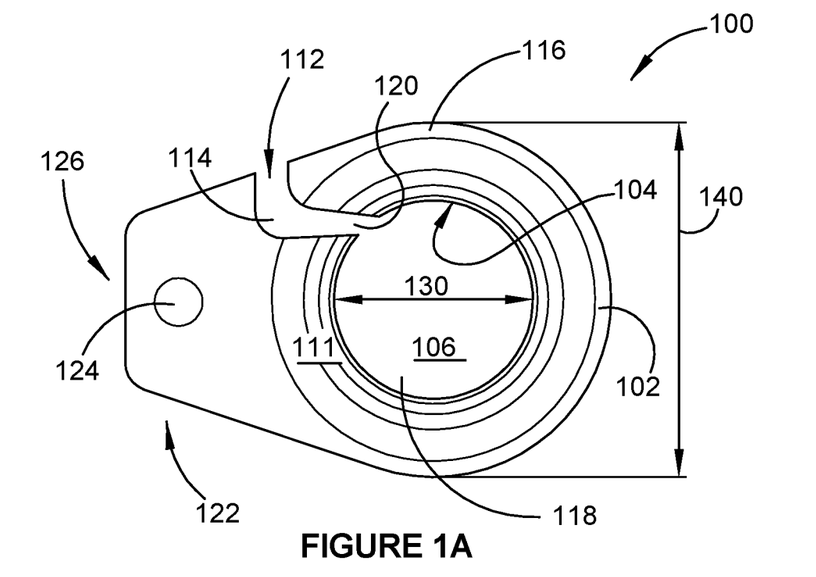
FIG. 1A is a side view of an embodiment of a fence device.
Figure 1B:
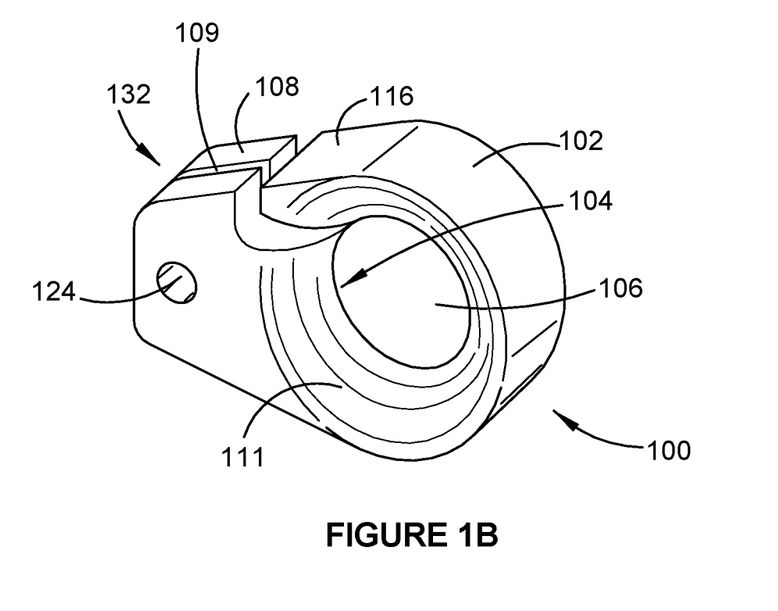
FIG. 1B is a perspective view of the fence device of FIG. 1A.

FIGS. 1A and 1B of the drawings show a fence device 100 for supporting a fencing wire. The device 100 has a body 102 having an inner surface 104 defining an aperture 106 through the body 102. The aperture 106 is for receiving the fencing wire. The inner surface 104 is at least partially convex towards the aperture 106. The inner surface 104 is at least partially convex to form a ramp 111 into the aperture so that, in use, the fencing wire is guided across the surface and through the aperture 106.

In the exemplary embodiment, the fence device 100 includes an ingress 112 to the aperture 106, configured to provide an entryway for a wire into the aperture 106. In alternative embodiments, the fence device 100 does not include an entryway, and fence wire is simply threaded through the aperture.

As illustrated in FIG. 1A, the ingress 112 is formed by a channel 114 connecting an outside 116 of the body 102 and the aperture 106. The cross-section of the channel in this example is substantially L-shaped, however any suitable shape may be utilised for the channel that allows a fence wire to be slid into the fence device so as to be positioned within the aperture 106. For example, the channel may be straight, C-shaped, zig-zag, etc. The width of the channel 114 may be between 3 and 5 mm, for example 4 mm.

In alternative embodiments, the ingress 112 may include a cover or a latch so as to securely retain the fence wire within the device 100. In some embodiments the ingress 112 may include a resilient member or a resilient means so that the ingress can be pushed open in order to insert the fence wire, and will then reclose once the wire has been inserted and any applied pressure released.

In the exemplary embodiment, the ingress 112 is positioned on an upper half of the body 102, or at least spaced away from the floor 118 of the aperture, the floor 118 being a lower portion within the device 102 when oriented in a substantially vertical in-use arrangement. This positioning of the ingress 112 tends to avoid the fence wire accidentally slipping out, as the wire will tend to be pulled downward by gravity and is unlikely to move upward (or upward and sideways, as in this example where the ingress opening 120 into the aperture 106 is offset from both vertical and horizontal centrelines of the body 102).

In some embodiments the device forms part of a fence post, for example integrally formed or attached to a fence post during manufacture or assembly. In other embodiments, the device is separate from the fence post, and is configured to be attachable to a fence post. For example, the fence device may include a connecting means that is configured to connect the fence device to the fence post.

Figure 2:
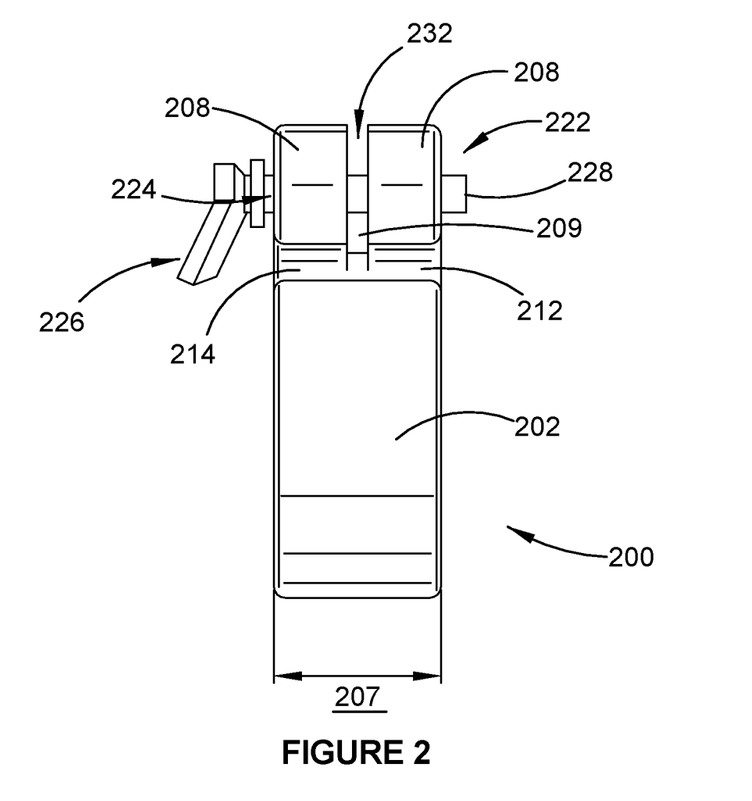
FIG. 2 is a top view of the fence device of FIGS. 1A and 1B, illustrating the functionality of the connecting means.

As can be seen most clearly in FIG. 2, in the exemplary embodiment, the fence device 200 has a connecting means 222 that has a receiving region 232 configured to receive a portion of a fence post therein. In this embodiment, the receiving region 232 comprises a pair of holding tabs 208 defining a picket channel 209 configured to fit onto a vertical element of a Y-post (also called a "star post" or "star picket"). In alternative embodiments, for example where a different type and different shaped post is used, the receiving region may have a different shape to accommodate the shape of the relevant post.

The connecting means 222 also has a locking means 226 configured to join the device to the fence post. In the exemplary embodiment illustrated here, the locking means 226 includes a pin aperture 224 in the form of an eyelet in each of the holding tabs 208, the two pin apertures 224 aligned and configured to receive a locking pin 228. The pin apertures are sized and shaped according to the locking pin used, and may have a diameter between 7 and 10 mm, for example 8-9 mm. In some embodiments the locking pin 228 may form part of the device 200, for example the locking pin may be slideably, hingedly, or otherwise attached or connected to the device 200. Various mechanisms may be used to attach the device 200 to a fence post, for example a simple application of wire threaded through the pin apertures 224 and wrapped through or around a portion of the fence post may be used. In the exemplary embodiment, a locking pin 228 is used that is a separate mechanism, and may be any suitable pin that can engage with the locking means 226 of the device 200, such as a push-through plastic clip with resilient split ends and a locking head, such as the Gallagher nylon pins otherwise used for pinlock insulators.

It will be understood that the device 100 may have a variety of shapes, sizes, and configurations without departing from the spirit and scope of the invention. The body 102 of the device may, for example, be substantially square, rectangular, D-shaped, etc. Similarly, the aperture 106 may be oval, elongated, or D-shaped.

In the exemplary embodiment, the inner surface 104 of the device 100 is annular so that the aperture is substantially 106 round. Also, the body 102 of the device 100 is substantially annular, with an outer diameter 140 of 40-70 mm, for example 60-65 mm, and preferably with a thickness 207 between 10 and 40 mm, for example 30 mm. In this embodiment, because of the particular configuration and method of manufacturing, the thickness 210 supports the convex shape on the inner surface 104 that forms the ramp 111 into the aperture, allowing the fencing wire to move freely across the surface and through the aperture 106.

Figure 3:
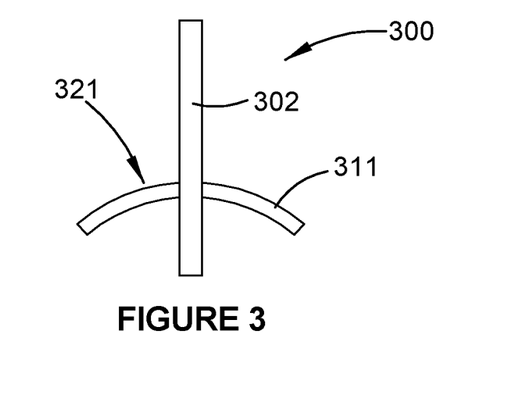
FIG. 3 is a front view of another embodiment of a fence device.

However, in alternative embodiments, the body 102 and the ramp 111 may be configured differently. For example, referring to the embodiment illustrated in FIG. 3, the body 302 of the fence device 300 is relatively thin (for example formed from sheet metal), and convex surface forming the ramp 311 provides a bridge 321 that leads into and out of the device 300, bridging the body 302 of the device 300 thereby providing an unhindered passage for the fence wire (for example barbed wire) to move.

In the illustrated embodiments, the aperture 106 is sized to have a diameter 130 between 30 and 40 mm, for example 35 mm. Advantageously, this allows the movement of the barbs on a typical barbed wire therethrough.

The fence device may be made from any suitable material, for example metal such as stainless steel or a hard plastic such as a thermoplastic polymer, e.g. a polycarbonate. The preferred embodiment is made from a thermoplastic polymer such as high-density polyethylene (HDPE), via an injection moulding process.

Figure 4:
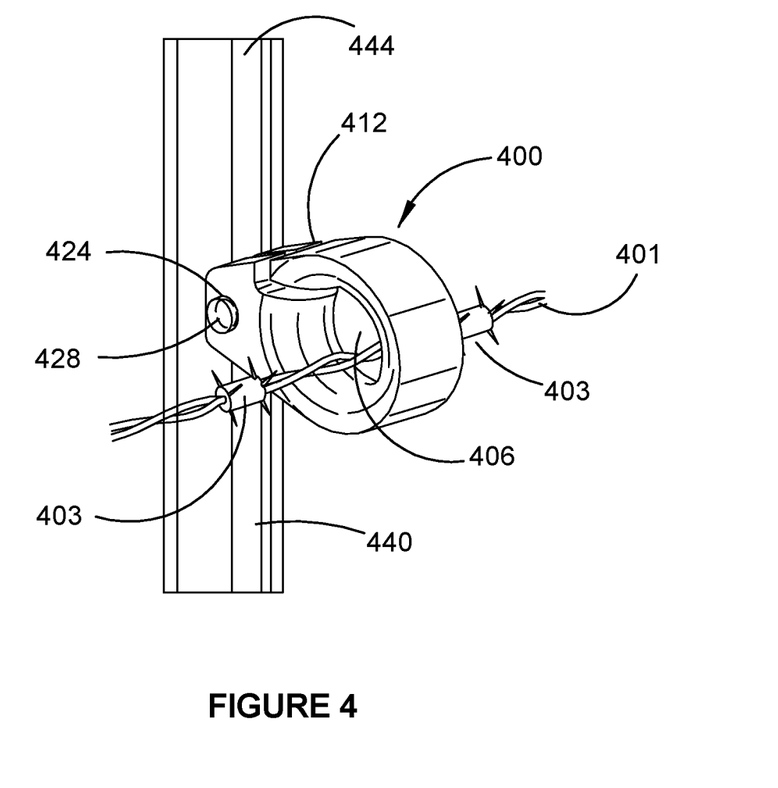
FIG. 4 shows a fence device attached to a fence post.

FIG. 4 shows a fence device 400 attached to a fence post 440, with a barbed wire 401 running through the aperture 406. The fence device 400 is attached to one of the post's three vertical elements 444: the vertical element 444 is received in the picket channel 209, and a locking pin 428 passes through the pin apertures 424 of the holding tabs 408 and a corresponding aperture on the vertical element 444 of the post 440 that the pin apertures 424 are aligned with, thereby securing the fence device 400 to the post 440. In the event that the wire 401 needs to be removed from the fence device, it can be slid out via ingress 112. It can be seen that should the wire be tightened while in place, the barbs 403 on either side of the fence device 400 would be able to move freely through the aperture 406.

Figure 5A:
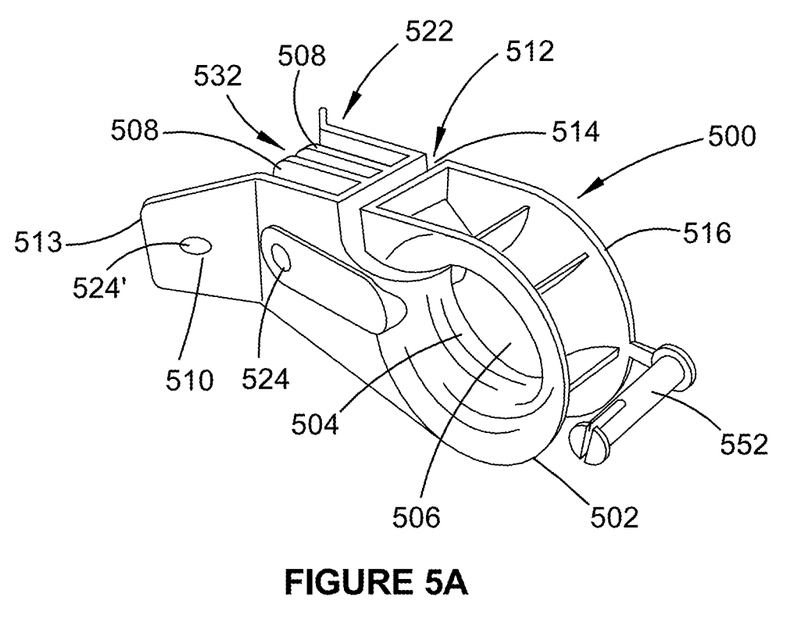
FIG. 5A is a perspective view of another embodiment of the fence device.
Figure 5B:
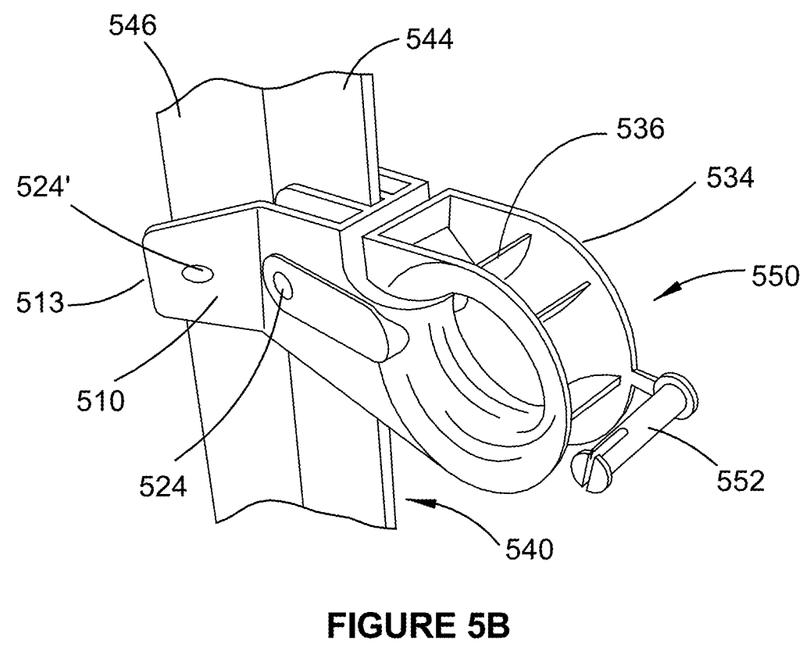
FIG. 5B is a perspective view of the fence device of FIG. 5A when attached to a fence post.

FIGS. 5A and 5B show an alternative embodiment of a fence device 500. The device 500 has a body 502 having an inner surface 504 defining an aperture 506 through the body 502. The aperture 506 is for receiving the fencing wire. The inner surface 504 is at least partially convex towards the aperture 506. The inner surface 504 is at least partially convex to form a ramp 511 into the aperture so that, in use, the fencing wire is guided across the surface and through the aperture 506. The fence device 500 includes an ingress 512 to the aperture 506, the ingress 512 formed by a channel 514 connecting an outside 516 of the body 502 and the aperture 506, and configured to provide an entryway for a wire into the aperture 506.

Figure 12A:
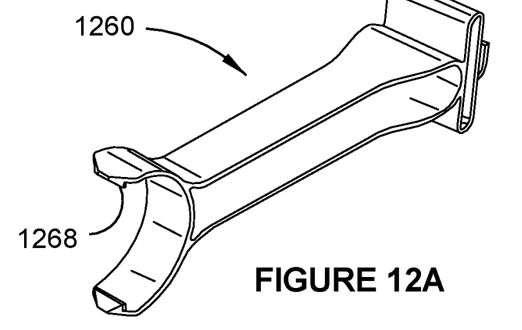
FIG. 12A is a perspective view of another embodiment of a wire guide attachment.
Figure 12B:
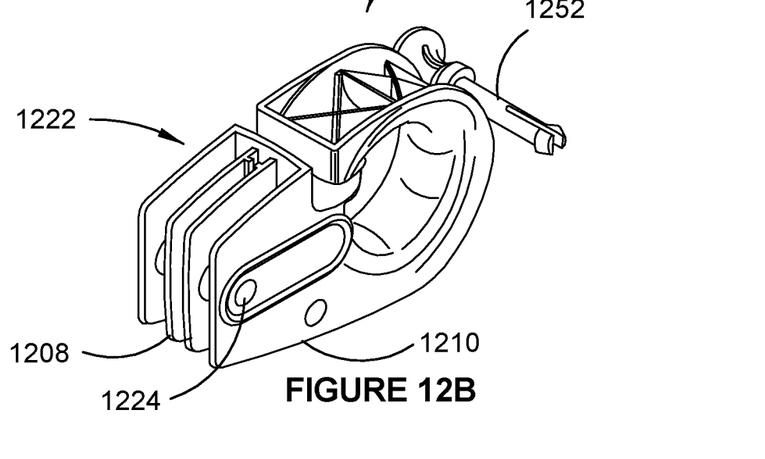
FIG. 12B is a perspective view of another embodiment of a fence device.
Figure 12C:
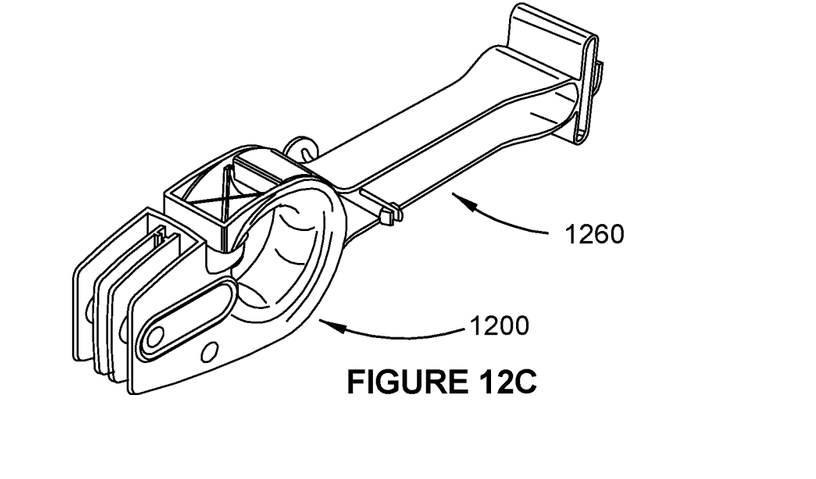
FIG. 12C is a perspective view of the wire guide attachment of FIG. 12A connected to the fence device of FIG. 12B.

The fence device 500 has a connecting means 522 that has a receiving region 532 configured to receive a first vertical element 544 of a fence post 540 therein. In this embodiment, the receiving region 532 comprises a pair of holding tabs 508 defining a picket channel 509 configured to receive the first vertical element 544 of the fence post therein. The connecting means 522 also includes a pair of connecting tabs 510 flanking the holding tabs 508. In some embodiments each connecting tab 510 is configured to extend past the holding tabs 508 and the first vertical element 544 with an outwardly projecting flange having a tab end 513. In other embodiments as illustrated in FIGS. 12A to 12C, the connecting tabs do not include the extending flanges. In the embodiment illustrated in FIGS. 5A and 5B the connecting tabs 510 are adapted to be positioned in parallel and/or adjacent and/or abutting the other two vertical elements 546 on the far side of the post 540. The connecting tabs 510 each have a pin aperture 524' in the form of an eyelet and configured to receive a locking pin (not shown) that passes through the pin aperture 524' and a corresponding aperture of the vertical element 544 thereby securing the fence device 500 to the post 540. In some embodiments, the connecting tabs 510 are at least partially resilient so that the tab end 513 can be urged to lie against the vertical element 546 when the locking pin (or equivalent connective mechanism) is applied to attach the fence device 500 to the fence post 540. In some embodiments the connecting tabs 510 also include second pin apertures 524 with similar aligned apertures in the holding tabs 508 so that a pin may be used to secure the fence device 500 to a vertical element 544 having an aperture therethrough.

The fence device 500 includes an attachment connector 550 configured to connect a wire guide attachment to the fence device 500. In this embodiment, the attachment connector 550 includes an attachment guide 552, an attachment seat 534, and a pair of connector ribs 536.

Figure 6A:
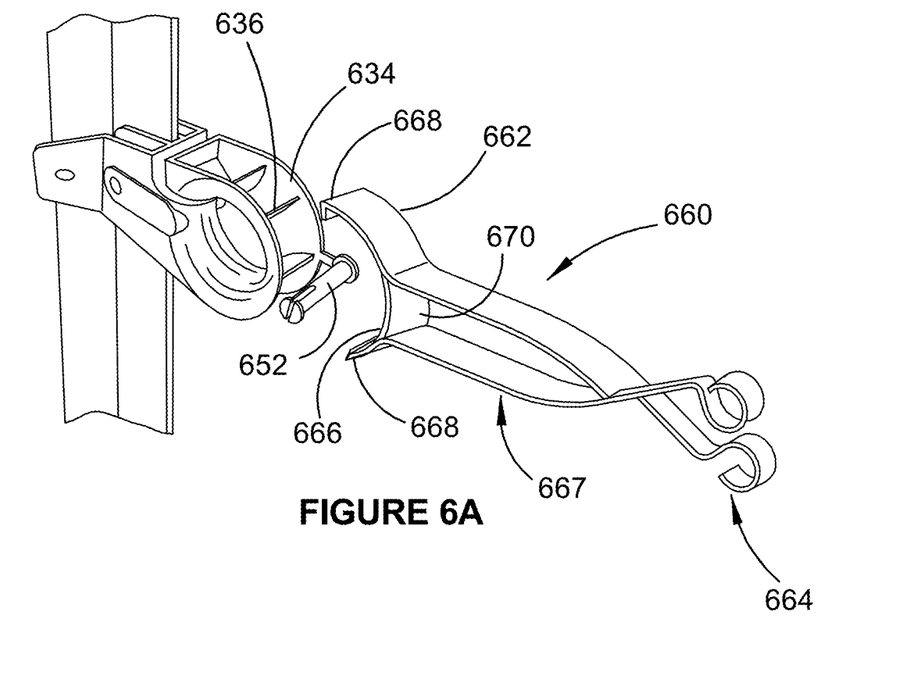
FIG. 6A is a perspective view the fence device of FIGS. 5A and 5B with a first embodiment of a wire guide attachment.
Figure 6B:
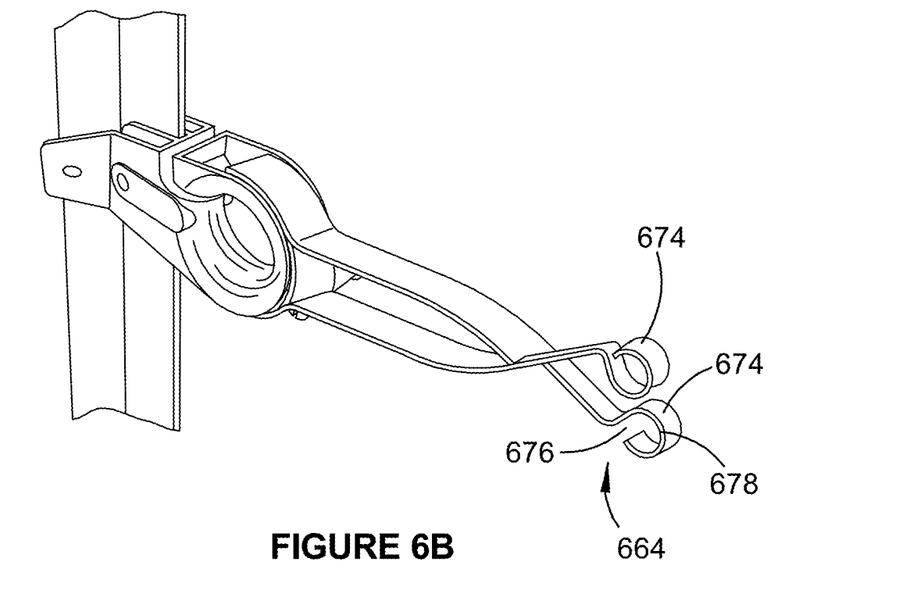
FIG. 6B is the fence device of FIGS. 5A and 5B with the wire guide attachment of FIG. 6A attached thereto.

A first embodiment of a wire guide attachment 660 is shown in FIGS. 6A and 6B. The wire guide attachment 660 has a connector 662 configured to cooperate with the attachment connector 650 of the fence device 600 so as to connect the wire guide attachment 660 to the fence device 600, and a wire guide 664 configured to support at least one wire (for example a plain metal wire, an electrified metal wire, a barbed wire, turbo braid or electrified tape). In the exemplary embodiment illustrated in FIGS. 6A and 6B, the connector 662 includes a curved support 666 shaped to sit on the attachment seat 634, and having a pair of inward curving grips 668 that cooperate with the pair of connector ribs 636 to hold the wire guide attachment in place on the fence device 600. The support 666 is at least partially resilient to allow the grips 668 to be positioned over the ribs 636 and to urge towards the ribs 636 so as to hook the grips 668 under or behind an edge of each rib 636 to thereby secure the wire guide attachment 660 to the fence device 600. The connector 662 also includes a positioning member 670 (in this embodiment formed by a central region of the support 666), which is positioned between the attachment guide 652 and the attachment seat 636 so as to guide the wire guide attachment 660 into place during set up, and also to provide an additional hold, together with the grips 668.

In the exemplary embodiment, the connector 662 is spaced from the wire guide 664 by a connecting spacer 672. The connecting spacer 672 holds the wire guide 664 away from the fence device 600 and away from the post 640. For embodiments where an electrified wire is run through the wire guide 664, the connecting spacer 672 ensures that a distance is maintained between a wire (e.g. a barbed wire) that is supported in the aperture 606 of the fence device and the electrified wire supported by the wire guide 664. This distance may be 10-20 cm, for example 15 cm. According to the AS/NZS 3014-2003 electrical installation standards, a plain wire in an existing fence containing barbed wire or razor wire may be electrified provided the electrified wire is offset horizontally from the plane of the fence wire by not less than 150 mm.

In this embodiment, the wire guide 664 includes a pair of guides 674, each having a support formation 678 for supporting or guiding a wire, and an ingress slot 676 for inserting a wire into the support formation 678.

Figure 7A:
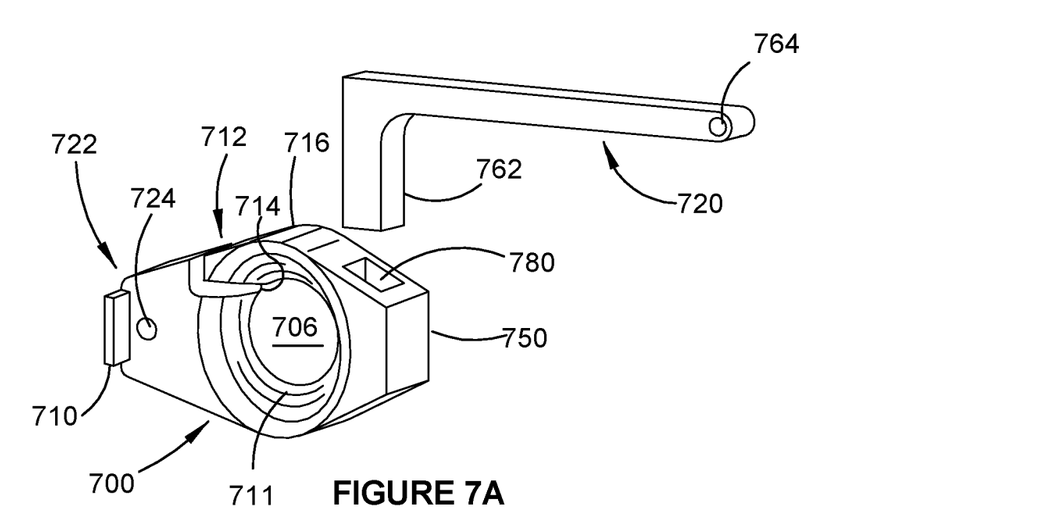
FIG. 7A is a perspective view of another embodiment of a fence device with a second embodiment of a wire guide attachment.
Figure 7B:
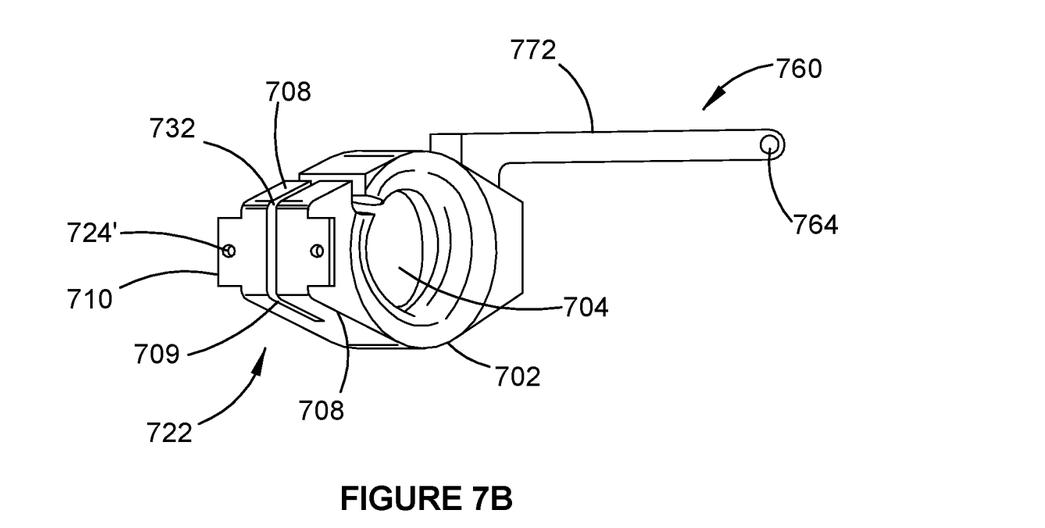
FIG. 7B is the fence device of FIG. 7A with the second embodiment of a wire guide attachment positioned within the fence device.

FIGS. 7A and 7B show another embodiment of a fence device 700, having a second embodiment of a wire guide attachment 760. The fence device 700 is similar to the embodiment illustrated in FIGS. 1A and 1B, and has a body 702 having an inner surface 704 defining an aperture 706 through the body 702. The aperture 706 is for receiving the fencing wire. The inner surface 704 is at least partially convex to form a ramp 711 into the aperture so that, in use, the fencing wire is guided across the surface and through the aperture 706. The fence device 700 includes an ingress 712 to the aperture 706, the ingress 712 formed by a channel 714 connecting an outside 716 of the body 702 and the aperture 706, and configured to provide an entryway for a wire into the aperture 706.

The fence device 700 has a connecting means 722 that has a receiving region 732 configured to receive a vertical element of a fence post therein. In this embodiment, the receiving region 732 comprises a pair of holding tabs 708 defining a picket channel 709 configured to receive a vertical element of a fence post therein. Each holding tab has a pin aperture 724', the two pin apertures 724' aligned and configured to receive a locking pin 728 therethrough when the fence device 700 is attached to a star picket. The connecting means 722 also includes a pair of connecting flanges 710 each extending outward at a right angle from a respective holding tab 708, each connecting flange 710 having a mounting aperture 724 in a plane substantially perpendicular to the plane in which the fence device 700 aperture 706 lies. The mounting apertures 724' can be used for nails, screws, or similar attachment means when the fence device 700 is attached to a fence post such as a wooden fence post.

The fence device 700 includes an attachment connector 750 configured to connect a wire guide attachment 760 to the fence device 700. In this embodiment, the attachment connector 750 includes an attachment channel 780.

In this embodiment, the wire guide attachment 760 has a connector 762 configured to be received in the attachment channel 780 of the fence device 700 so as to connect the wire guide attachment 760 to the fence device 700. In some embodiments, the attachment connector 750 of the fence device 700 and/or the connector 762 of the wire guide attachment 760 includes a locking mechanism for securing the wire guide attachment once inserted into the attachment channel 780, such as a locking pin arrangement.

The wire guide attachment 760 also has a wire guide 764 configured to support at least one wire (for example a plain metal wire, an electrified metal wire, a barbed wire, or electrified tape). In the exemplary embodiment, the connector 762 is spaced from the wire guide 764 by a connecting spacer 772. The connecting spacer 772 positions the wire guide 764 away from the fence device 700 and away from the post. For embodiments where an electrified wire is run through the wire guide 764, the connecting spacer 772 ensures that a distance is maintained between a wire (e.g. a barbed wire) that is supported in the aperture 706 of the fence device 700 and the electrified wire supported by the wire guide 764. This distance may be 10-20 cm, for example 15 cm. The wire guide 764 may be in the form of one or more spaced apertures towards the end of, or spaced along the connecting spacer 772.

Figure 8A:
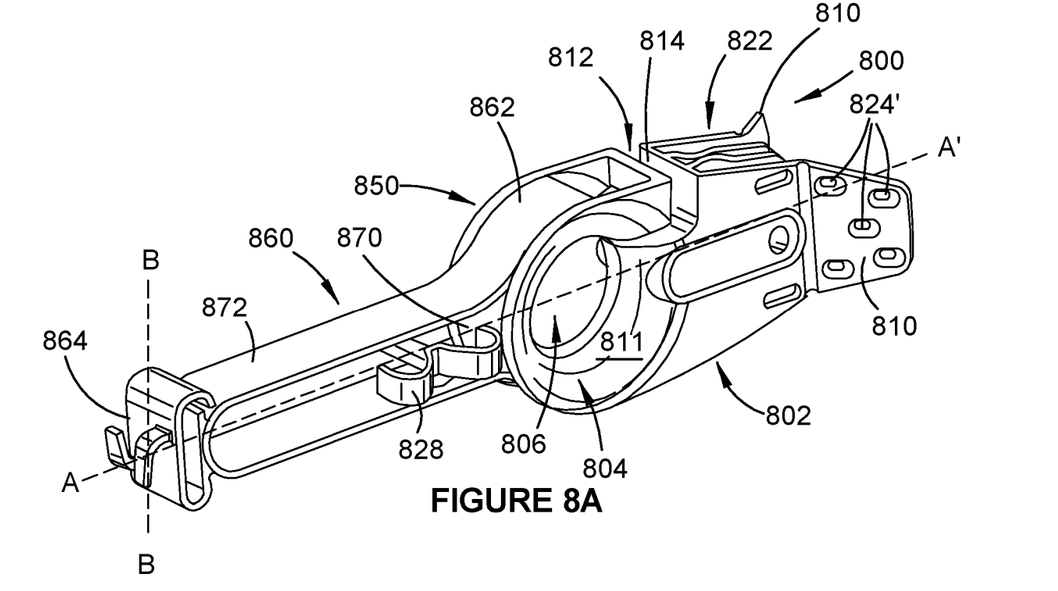
FIG. 8A is perspective view of another embodiment of a fence device with a third embodiment of a wire guide.
Figure 8B:
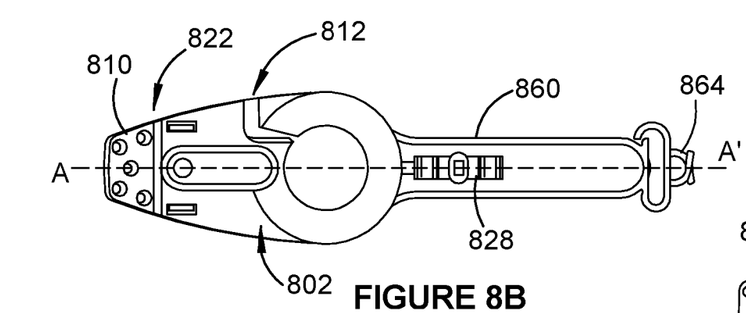
FIG. 8B is a side view of the fence device of FIG. 8A.
Figure 8C:
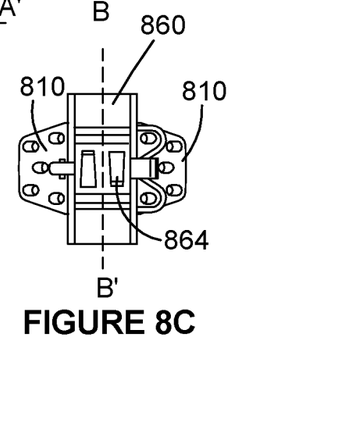
FIG. 8C is a end view of the fence device of FIG. 8A.
Figure 8D:
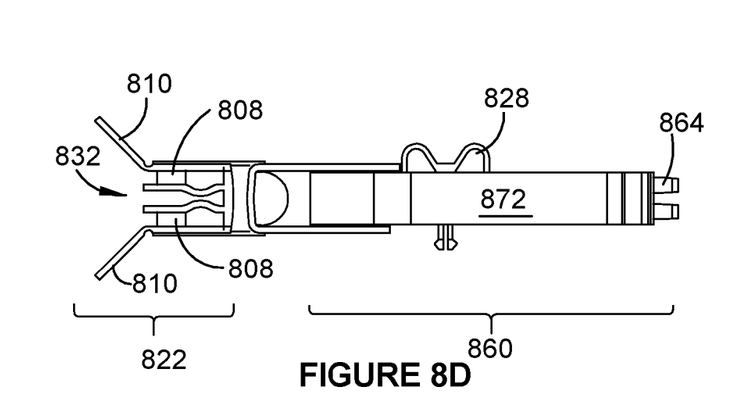
FIG. 8D is a top view of the fence device of FIG. 8A.

FIGS. 8A, 8B, 8C and 8B show an alternative embodiment of a fence device 800. The device 800 has a body 802 having an inner surface 804 defining an aperture 806 through the body 802. The aperture 806 is for receiving the fencing wire. The inner surface 804 is at least partially convex towards the aperture 806. The inner surface 804 is at least partially convex to form a ramp 811 into the aperture so that, in use, the fencing wire is guided across the surface and through the aperture 806. The fence device 800 includes an ingress 812 to the aperture 806, the ingress 812 formed by a channel 814 connecting an outside of the body 802 and the aperture 806, and configured to provide an entryway for a wire into the aperture 806.

The fence device 800 has a connecting means 822 for connecting the device 800 to a fence post. The connecting means 822 has a receiving region 832 configured to receive a first vertical element of a fence post therein (not shown). In this embodiment, the receiving region 832 comprises a pair of holding tabs 808 defining a picket channel therebetween configured to receive the first vertical element of the fence post therein (not shown). The connecting means 822 also includes a pair of connecting tabs 810 flanking the holding tabs 808, each configured to extend past the holding tabs 808 and the first vertical element of the fence post, and adapted to be positioned in parallel and/or adjacent and/or abutting the other two vertical elements on the far side of the post. The connecting tabs 810 each have a plurality of pin apertures 824 in the form of eyelets, each configured to receive a locking pin that could in use pass through the respective pin aperture and a corresponding aperture of the vertical element thereby securing the fence device 800 to the post. By providing a plurality of apertures, the position of the fence device 800 can be adjusted to allow for alignment of corresponding apertures in the device 800 and the post. If the post is wooden, the pin apertures 824 in the connecting tabs 810 can be to attach the device 800 to a wooden fence post using one or more of the apertures 824 as a securing means for a screw or a nail. In some embodiments, the connecting tabs 810 are at least partially resilient so that the ends of each can be urged to lie against the vertical element of the fence post.

The fence device 800 includes an attachment connector 850 configured to connect a wire guide attachment 860 to the fence device 800.

The wire guide attachment 860 has a connector 862 configured to cooperate with the attachment connector 850 of the fence device 800 so as to connect the wire guide attachment 860 to the fence device 800, and a wire guide 864 configured to support at least one wire (for example a plain metal wire, an electrified metal wire, a barbed wire, or electrified tape). The fence device 800 includes an attachment guide 852. The attachment guide 852 can take the form of a removable locking pin 828. The connector 862 includes a positioning member 870, which is positioned between the attachment guide 852 and the attachment connector so as to guide the wire guide attachment 860 into place during set up, and also to provide an additional hold, together with the grips of the connector 862. Once the wire guide attachment 860 is in place, the removable locking pin 828 can be removed and inserted into aperture 824'.

The removable locking pin 828 (which can be referred to as a break-away pin) can be manufactured connected to the body 802 of device 800. The removable locking pin 828 can be broken off using the force such as a twisting force applied by the user's fingers. The removable locking pin 828 can be configured so as to be easily grippable and twistable with the fingers. Thus, the locking pin 828 can have one end formed into finger loops which can be embodied as an M-shape or similar, so that the user can push their fingers in, grab the locking pin 828 and pull it out from the body 802.

Figure 9A:
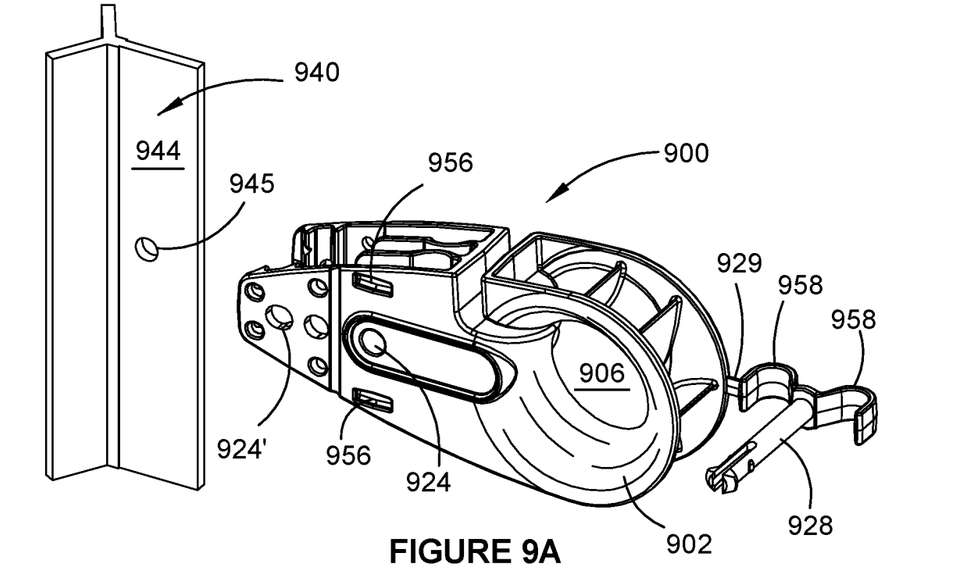
FIG. 9A is a perspective view of an embodiment of a fence device just prior to being attached to a fence post.
Figure 9B:
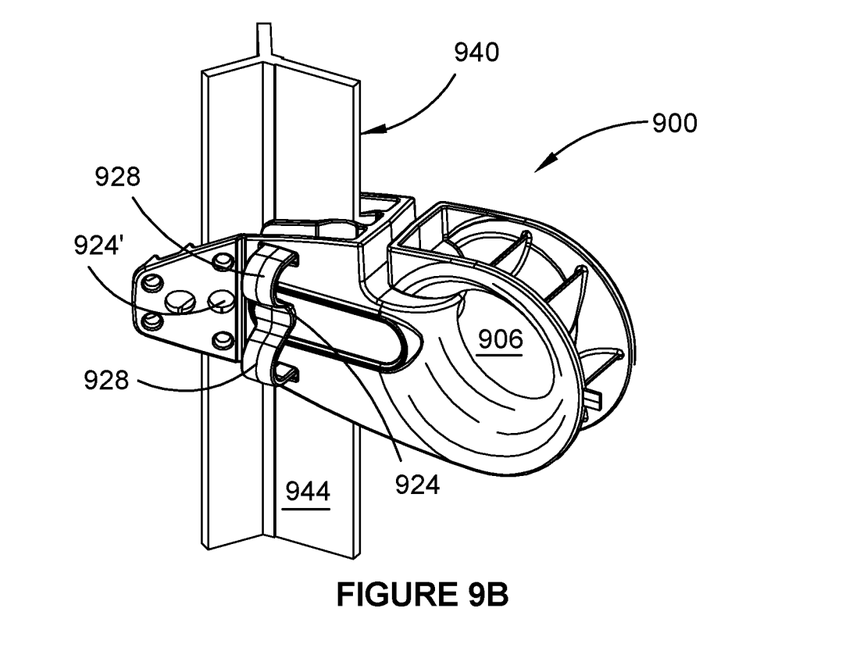
FIG. 9B is a perspective view of the fence device of FIG. 9A once attached to the fence post.

A close-up of the locking pin 928 attached to body 902 can be seen in FIG. 9A. The weak connection point 939 can be broken by twisting the locking pin 928 using finger force. The locking pin 928 can then be inserted into the aligned apertures 924 in body 902 of the device 900 and aperture 945 in fence post 940. As shown in FIG. 9B, once inserted into the aligned apertures 924 (apertures in the device body 902 and the fence post 940), the ends 958 of the head of the locking pin 928 can push into slots 956 defined in the body 902. These slots 956 can be positioned to act as guides so that the user knows in which orientation to push the locking pin 928 into the aperture 924 to ensure a snug fit.

Turning back to the exemplary embodiment shown in FIG. 8, the connector 862 is spaced from the wire guide 864 by a connecting spacer 872. The connecting spacer 872 holds the wire guide 864 away from the fence device 800 and away from the post. For embodiments where an electrified wire is run through the wire guide 864, the connecting spacer 872 ensures that a distance is maintained between a wire (e.g. a barbed wire) that is supported in the aperture 106 of the fence device and the electrified wire supported by the wire guide 864. This distance may be 10-20 cm, for example 15 cm. According to the AS/NZS 3014-2003 electrical installation standards, a plain wire in an existing fence containing barbed wire or razor wire may be electrified provided the electrified wire is offset horizontally from the plane of the fence wire by not less than 150 mm.

Figure 10A:
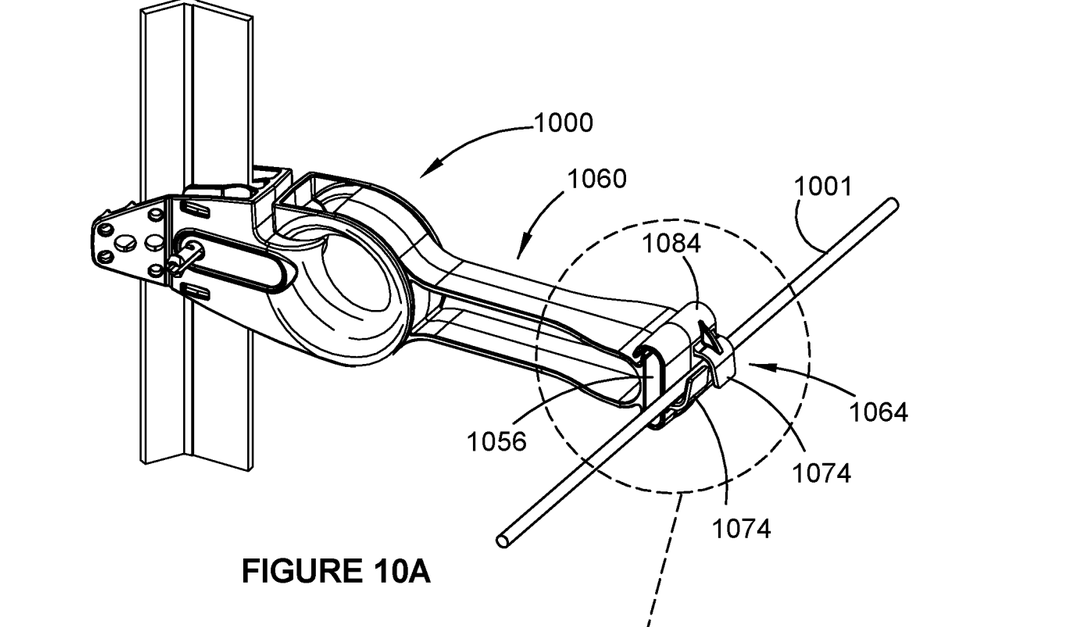
FIG. 10A is a perspective view of the fence device of FIG. 9B with an embodiment of the wire guide attached showing a wire in the wire guide.
Figure 10B:
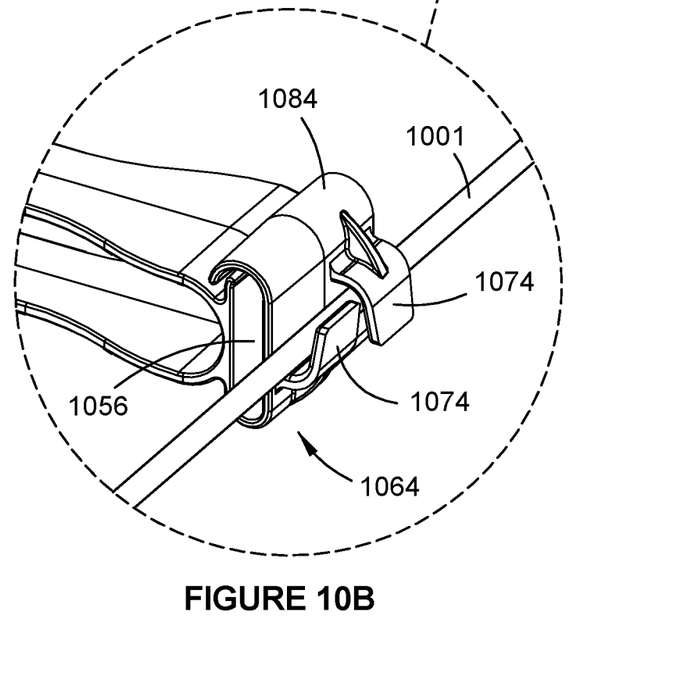
FIG. 10B is a close-up of a region of FIG. 10A.
Figure 10C:
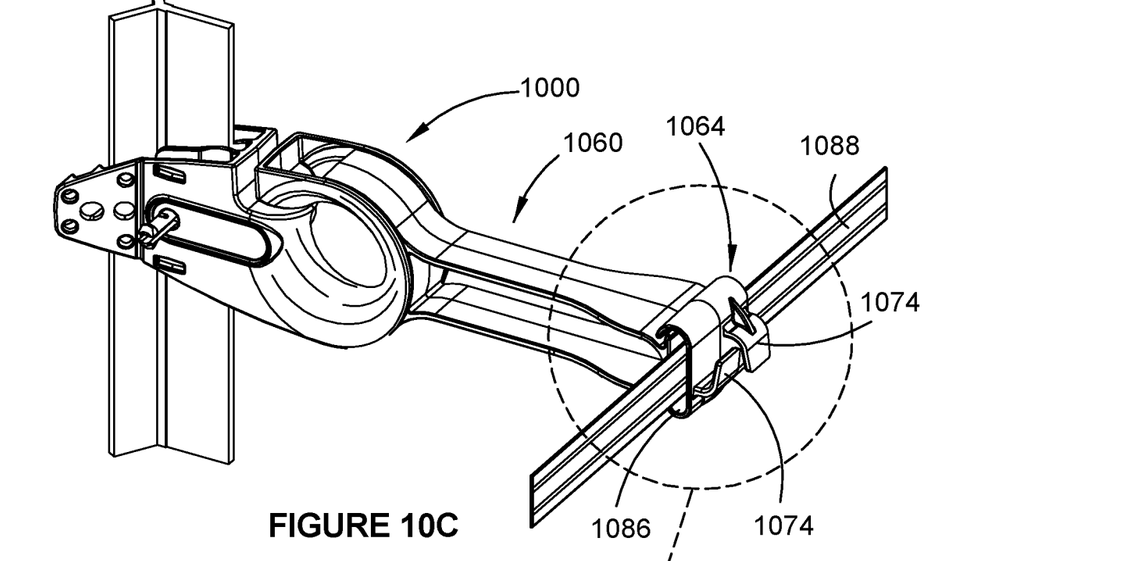
FIG. 10C is a perspective view of the fence device of FIG. 9B with an embodiment of the wire guide attached with electrical tape in the wire guide.
Figure 10D:
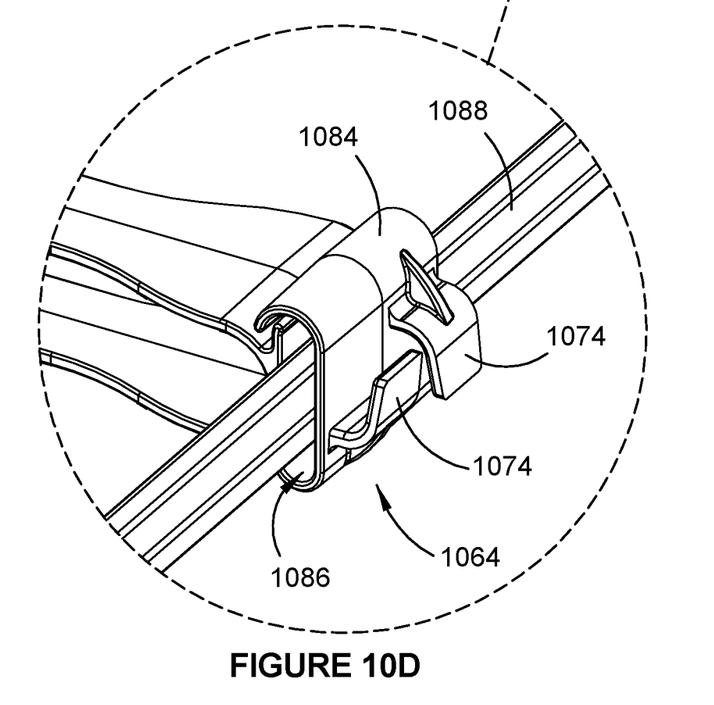
FIG. 10D is a close-up of a region of FIG. 10C.

In this embodiment, the wire guide attachment 864 includes a pair of guides 874, each having a support formation 878 in the form of an arm for supporting or guiding a wire, and an ingress slot 876 for inserting a wire into the support formation 878. The guides 874 are shown in close-up in FIGS. 10A, 10B, 10C and 10D. A first guide 1074 has an arm bent upwards and a second guide 1074 has an arm bent downwards, so that together they form a passageway. Once the wire 1001 is located under and over each arm 1074 respectively, through the passageway, any movement of the wire 1001 in use can be accommodated with reduced likelihood that the wire 1001 will be accidentally dislodged. While the wire 1001 may be difficult to accidentally dislodge from the device 1000, it can be relatively straightforward to intentionally remove it from the guides 1074 by lifting the wire over and under the respective guides 1074 during tightening or replacement and or maintenance. An elongate guide region 1086 can be provided as a part of the wire guide attachment 1064 and may be particularly suited to housing electrical tape 1088 which tends to be flat. Electrical tape 1088 (shown in FIGS. 10C and 10D) can be used in place of electrical wire 1001 (shown in FIGS. 10A and 10B) or turbo braid. The elongate guide region 1086 can comprise one or more arms 1084 configured to form an elongate (e.g. ovaloid) channel 1086. In some embodiments, the elongate guide region 1086 is the only region provided as the wire guide attachment 1064.

When deciding which embodiment of the fence device to use, the skilled person can first determine whether they need to attach the device to a T-post or a Y post. The device of e.g. FIGS. 1 and 2 may be suitable for connection to any post which has a vertical element that can be located into the receiving region 232 of connecting means 222. The connecting means 722 of the device of e.g. FIG. 7 may be best suited to a T-post since the connecting tabs 710 are oriented to accommodate the T-shape of the fence post's vertical elements. The connecting means 822 of e.g. FIG. 9 may be best suited to a Y-post since the connecting tabs 810 are oriented to accommodate the Y-shape of the fence post's vertical elements. The connecting tabs of the exemplary devices may provide additional structural stability by engaging with the vertical elements of the fence post in use.

Figure 11A:
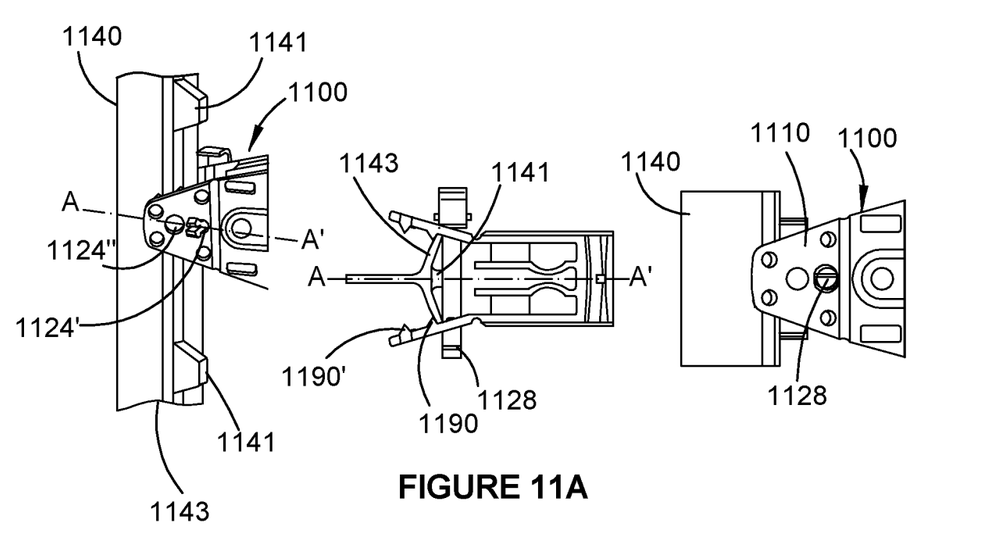
FIG. 11A is (from left to right) a perspective, top and side view of a part of an embodiment of the fence device connected to a T-post.
Figure 11B:
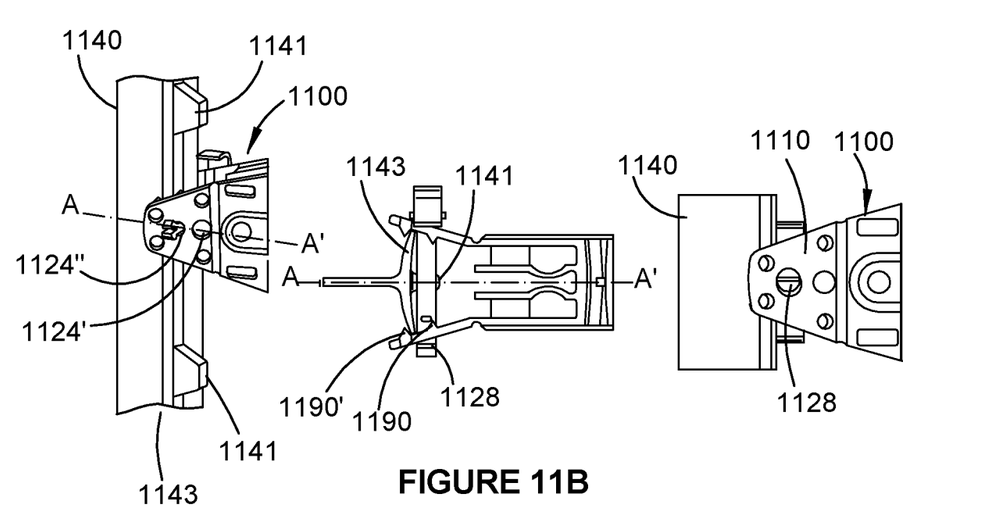
FIG. 11B is (from left to right) a perspective, top and side view of a part of an embodiment of the fence device connected to a T-post.

In the embodiment shown in FIG. 11A and FIG. 11B, the fence device 1100 is connected to an embodiment of a T-post 1140 that has a vertical element 1143 with a series of protrusions 1141. In order to engage with the device 1100, the vertical element 1143 is gripped between pairs of teeth 1190 provided on connecting tabs 1110. Once in position, locking pin 1128 passes through aperture 1124'. Depending on the size of the T-post, the vertical element 1143 can be gripped between a front row of teeth (1190) or a rear row of teeth (1190'). The locking pin 1128 can pass through an aperture 1124' formed forward in the body 1124' or rearward in the body 1124". In FIG. 11A, the T-post is slightly smaller than the one depicted in FIG. 11B. It can be seen in FIG. 11B that in order to accommodate the slightly larger vertical element 1143 of the fence post, the locking pin 1128 passes through aperture 1124" and teeth 1190' engage with the vertical element 1143 to hold the device firmly into place on the post 1140. The indentations between the teeth 1190 on the connecting tabs 1110 can act like a vice grip when slid onto the metal of the fence post 1140. It should be understood that by providing additional teeth and optionally additional apertures spaced along the connecting tabs 1110, the fence device can be adapted to accommodate multiple different sizes of T-post. There can be additional holes in the connecting tabs 1110 which can in some embodiments be useful for draining any water that gets trapped in and around the device.

FIGS. 12A, 12B and 12C show another embodiment of a fence device 1200, having another embodiment of a wire guide attachment 1260. The fence device 1200 is similar to the embodiment illustrated in FIGS. 5A and 5B. The fence device 1200 includes central holding tabs 1208 (each with an aperture), and outer connecting tabs 1210 with pin apertures 1224 aligned with the apertures in the central holding tabs 1208, the apertures configured to receive a locking pin for attaching the fence device to a fence post. The attachment guide 1252 can take the form of a removable locking pin with a resilient tapered end for inserting into the pin apertures 1224, having an arrow-shaped end so that the pin is secured once inserted. On the other end the removable locking pin has a widened end forming a larger surface making it easier for the user to press the pin into the aperture.

The wire guide attachment 1260 is similar to the embodiment illustrated in FIGS. 8A to 8D, and has an attachment connector with inward curving grips 1268 that cooperate with the connector ribs. As illustrated, the ribs provided on around the fence device include transverse ribs such as the connector ribs, and also include diagonal strengthening ribs (in this embodiment in both directions to form a cross).

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Any promises made in the present description should be understood to relate to some embodiments of the invention, and are not intended to be promises made about the invention as a whole. Where there are promises that are deemed to apply to all embodiments of the invention, the applicant/ patentee reserves the right to later delete them from the description and does not rely on these promises for the acceptance or subsequent grant of a patent in any country.

The invention claimed is:

1. A fence device for supporting a fencing wire, the device comprising:
    a body having an inner surface defining an aperture through the body, the aperture for receiving the fencing wire,
    wherein the inner surface is at least partially convex towards the aperture;
    an attachment connector configured to connect a wire guide attachment for a second fencing wire to the fence device; and
    a removable wire guide attachment configured to connect with the body of the fence device via the attachment connector of the fence device, wherein the removable wire guide attachment comprises a wire guide configured to support the second fencing wire.

2. The fence device of claim 1, wherein the inner surface is at least partially convex to form a ramp into the aperture so that, in use, the fencing wire is guided across the surface and through the aperture.

3. The fence device of claim 1, further comprising an ingress to the aperture, configured to provide an entryway for a wire into the aperture, wherein, in use, the ingress is positioned on an upper half of the body.

4. The fence device of claim 3, wherein the ingress is formed by a channel connecting an outside of the body and the aperture, wherein a cross-section of the channel is substantially L-shaped.

5. The fence device of claim 1, further comprising a connecting means configured to connect the fence device to a fence post.

6. The fence device of claim 5, wherein the connecting means comprises:
    a receiving region configured to receive a portion of a fence post therein; and
    a locking means configured to join the device to the fence post.

7. The fence device of claim 6, wherein:
    the receiving region comprises a pair of holding tabs defining a picket channel configured to fit onto a vertical element of a Y-post; and
    the locking means comprises a pin aperture in each of the holding tabs, the pin apertures aligned and configured to receive a locking pin.

8. The fence device of claim 1, wherein the inner surface is annular so that the aperture is substantially round.

9. The fence device of claim 1, wherein the body of the device is substantially annular.

10. The fence device of claim 1, wherein the attachment connector comprises connector ribs that comprise transverse ribs across an outside of the body.

11. The fence device of claim 1, wherein the attachment connector comprises strengthening ribs that comprise diagonal ribs on across an outside of the body.

12. The fence device of claim 1, wherein the attachment connector comprises connector ribs configured to cooperate with the removable wire guide attachment, thereby securing the removable wire guide attachment to the fence device.

13. The fence device of claim 1, wherein the attachment connector comprises an attachment channel for receiving a connector of the removable wire guide attachment therein, thereby securing the wire guide attachment to the fence device.

14. The fence device of claim 1, wherein the attachment connector comprises connector ribs provided across an outside of the body to cooperate with the removable wire guide attachment, for a second fencing wire, thereby securing the wire guide attachment to the fence device.

* * * * *